Nov. 3, 1942.  E. A. ZETTERQUIST  2,300,758
BLADING AND BALANCING PISTON ARRANGEMENT
Filed May 13, 1941  2 Sheets-Sheet 1

WITNESSES:
James K. Mosser
Ronald E. Kaye

INVENTOR
Eric A. Zetterquist.
BY
ATTORNEY

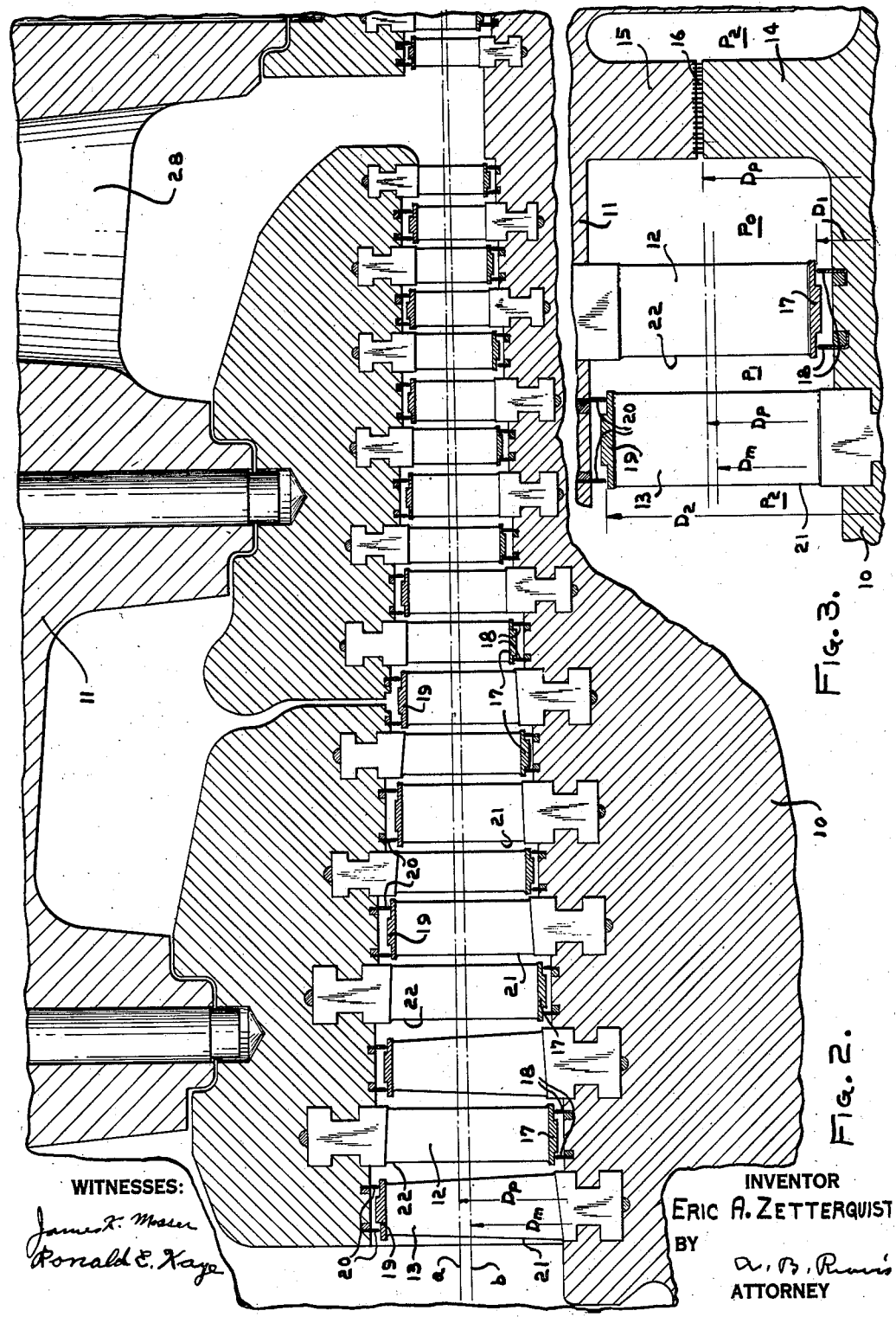

Patented Nov. 3, 1942

2,300,758

UNITED STATES PATENT OFFICE 2,300,758

BLADING AND BALANCING PISTON ARRANGEMENT

Eric A. Zetterquist, Drexel Hill, Pa., assignor to Westinghouse Electric & Manufacturing Company, East Pittsburgh, Pa., a corporation of Pennsylvania Application May 13, 1941, Serial No. 393,233

14 Claims. (Cl. 253—69)

The invention relates to elastic-fluid turbines of the axial-flow type wherein expansion of elastic fluid produces thrust on the rotor, and it has for an object to provide apparatus of this character having a single dummy piston effective to oppose elastic-fluid thrust with minimum variation in unbalanced thrust under variable conditions such as manufacturing errors, accumulation of deposits on blading, or the admission of elastic fluid through any one of a plurality of inlets.

A further object of the invention is to provide a turbine incorporating a dummy piston, stationary and moving rows of shrouded blades, and sealing means cooperating with the shrouds, and wherein the diameter of the dummy piston has such relation to the minimum and maximum sealing diameters of each pair of rows of blades and to the pressure drops over the latter that a single dummy piston may be used to balance the thrust resulting from each and all pairs of rows, or to give a thrust in the same direction and the total of which is the summation of components from each pair of rows with the components proportional to the pressure drops allotted to each pair.

With the advent of higher operating pressures and increased capacities of single turbine elements, it has become increasingly difficult to secure a sufficient margin above the safe load on the thrust bearing. Changes in thrust from the ideal condition, due to necessary tolerances in the manufacture of the blading and/or deposits of boiler compound on the blades, are, for identical blade groups, proportional to the total pressure drop taken over the group. In modern high-pressure turbines, this pressure drop may reach a value of 1000 lbs. or more per square inch and the change in thrust becomes ten times greater than if the pressure drop were but 100 lbs.

The hazards, as far as loading on the thrust bearing is concerned, are further augmented in conventional designs of blading balanced by a dummy piston where the blading is arranged on a constant drum diameter, or drum diameters increasing toward the low-pressure end, due to the fact that the low-pressure section is underbalanced by the dummy piston and the high-pressure section is overbalanced. A change in pressure drop, for example, over the last pair of rows of blades in such designs, will cause a change in thrust equal to the increase in pressure times the difference in area between the effective thrust diameter of the blade pair and the dummy diameter. Thus, as deposits occur in the high-pressure section or low-pressure section only, the change in thrust may easily become sufficient to cause failure of the thrust bearing.

While the design for constant mean blading diameter, provided for by having the rotor converge to the same extent that the cylinder diverges, in order to provide the required expanding passage, eliminates the hazards connected with constant or stepped-up drum type designs, it contains, nevertheless, certain elements of danger. As a constant mean blading diameter provides equal lengths of each blade outwardly and inwardly of the mean diameter circular envelope, it will be apparent that the blade annular area outwardly of the envelope increases more and more in relation to the blade annular area inwardly thereof as the blades increase in height. The result is that the thrust per pound pressure drop over each pair of rows increases from the inlet to the outlet of the blade group. Deposits on the blading will thus create a change in thrust. Similarly, in connection with a multiple valve straight reaction machine, there will be an increase or decrease in thrust loading with successive openings of the valves, thereby reducing the safety of the thrust bearing.

In order to overcome the aforementioned difficulties, the improved turbine, instead of being designed for a constant mean blading diameter, is designed for a constant effective diameter, that is, the turbine has each pair of rows of blades positioned in the blade path relative to the dummy piston in such a way that, by adjustment of the pressure drops allotted to the stationary and moving rows relative to the total pressure drop allotted to the pair, there is complete balance with the dummy piston. The ideal way to provide for this is by having the blading arranged on decreasing mean diameters toward the low-pressure end, in which case the sealing diameters of the stationary and moving rows may be located so as to allow the relation of pressure drops within each pair to be such as to produce equal velocity ratios between the moving and stationary rows throughout to give maximum efficiency. If the pressure drops across the stationary and moving row of blades in a stage are equal, then the effective diameter, or diameter of the dummy piston, balancing the pair, is equal to the square root of ½ of the sum of the squares of the maximum sealing diameter of the moving row of blades and the minimum sealing diameter of the stationary row of blades in the stage. The velocity ratios in this case become nearly the same.

It is evident that, with some sacrifice in efficiency, I may, by adjustment of pressure drops, make the effective diameter coincide with the mean blading diameter, and that, with further sacrifice in efficiency, the effective diameter may be made smaller than the mean blading diameters.

In a turbine, as hereinbefore described, should deposits occur either in the high-pressure end or the low-pressure end, the loading on the thrust bearing will not be affected; and, in the case of a multiple valve straight reaction machine, the thrust loading will remain constant with successive opening and closing of the valves.

Accordingly, a further object of the invention is to provide a turbine having blading so arranged that each stage thereof requires the same dummy piston diameter to provide a balanced relation of stage and dummy piston thrust for the stage pressure drop.

A further object of the invention is to provide a turbine having a plurality of steam admission inlets together with blading arranged on decreasing mean diameters toward the low-pressure end and a single dummy piston for balancing the blading steam thrust.

These and other objects are effected by my invention as will be apparent from the following description and claims taken in accordance with the accompanying drawings, forming a part of this application, in which:

Fig. 2 is a sectional view of the low-pressure end portion of the turbine shown in Fig. 1 and drawn to larger scale; and, Fig. 3 is a diagrammatic view illustrative of principles of the invention.

Figure 1:
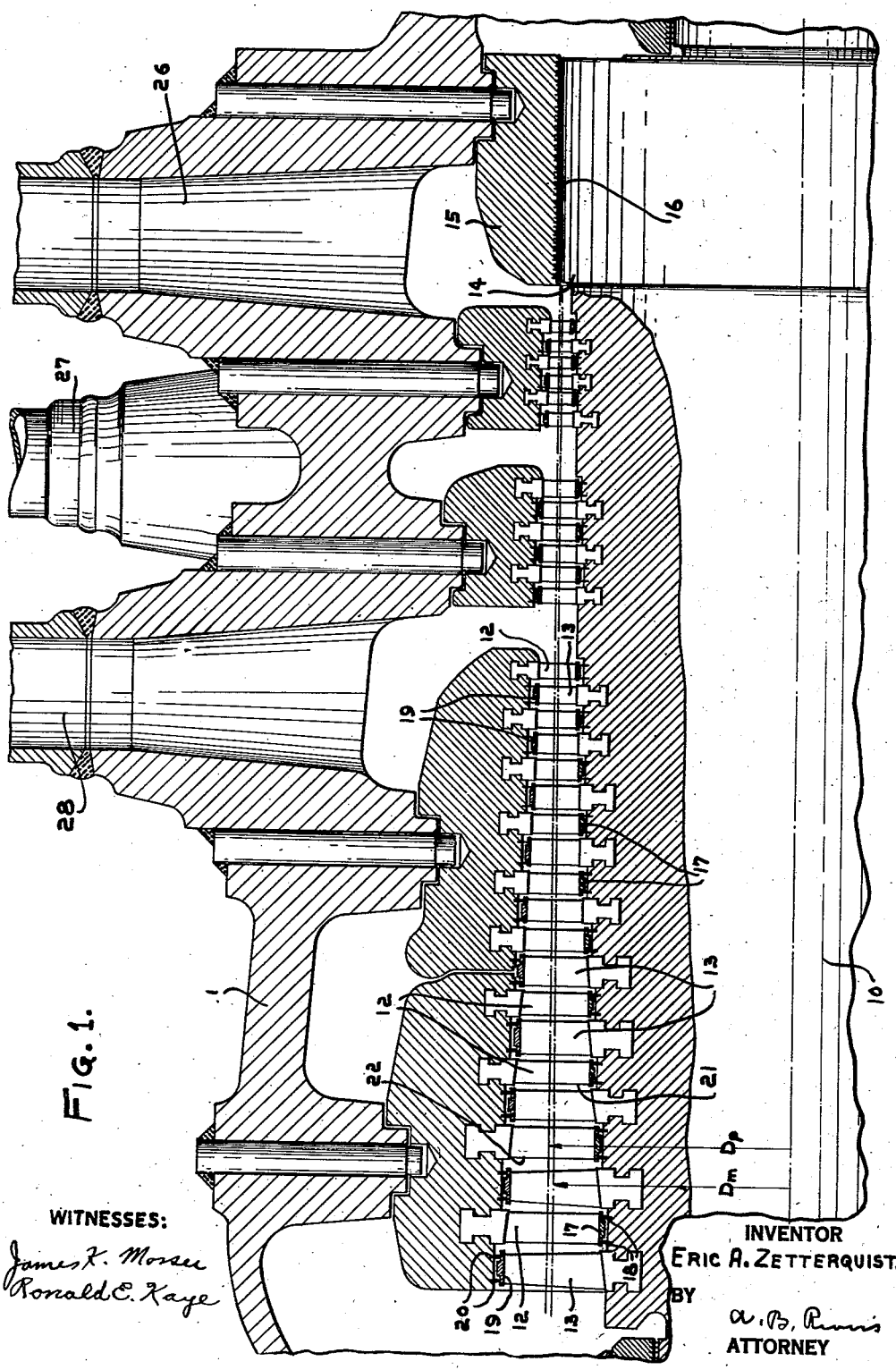
Fig. 1 is a longitudinal sectional view of the improved turbine.

Referring now to the drawings more in detail, in Fig. 1, there is shown a turbine including a spindle 10 and a casing or cylinder 11 carrying the stationary and moving rows of blades 12 and 13. The steam thrust imposed on the blading is balanced by means of the dummy piston 14.

As shown, the dummy piston 14 is encompassed by a ring 15 carried by the casing and suitable packing 16, preferably of the labyrinth type, is arranged between the dummy piston and the ring. The stationary row of blades 12 has a shroud 17 with which cooperates the sealing strips 18 to seal the annular space between the shroud and the spindle. Likewise, the moving row of blades has a shroud 19 with which cooperate the sealing strips or means 20 for sealing the annular space between the latter and the casing 11.

Furthermore, with a turbine having a plurality of inlets for admitting steam for flow through all of the rows of blading or for flow through a reduced number of such rows and with the blading arranged on decreasing mean diameters such that the annular diverging flow passage defined by the blading has an inner boundary which converges relatively more than the outer boundary diverges, it becomes possible to provide a balancing piston of larger diameter than the mean diameter of the first row of blades and capable of balancing the steam thrust regardless of the inlet through which steam is admitted.

As shown in Figs. 1 and 2, the annular diverging or flow passage for steam is defined by inner and outer boundaries, the inner boundary converging and including the exit edges 21 at the roots of the moving blades and the outer boundary diverging and including the exit edges 22 at the roots of the stationary blades. The convergence of the inner boundary is larger than the divergence of the outer boundary so that the blading may be arranged on decreasing mean diameters toward the low-pressure end of the turbine sufficiently to dispose all of the blading on a constant effective diameter; and, as the dummy piston diameter required for balance is equal to the effective diameter, it will be apparent that balance is maintained irrespective of increase in blade height or the number of rows of blades through which the stream is expanded.

Referring to diagrammatic Fig. 3, wherein the stage is representative of the blading of Fig. 1, diameters and pressures are indicated as follows:

$D_1$ = the diameter of the spindle sealing strips 18, that is, it represents the minimum sealing diameter of the blading.

$D_2$ = the outer diameter of the blade shroud, that is, the maximum blade row sealing diameter.

$D_p$ = the diameter of the balancing piston, that is, the effective diameter for balancing the blade thrust.

$p_0$ = the pressure at the stage inlet $p_1$ = the pressure between the stationary and moving blade rows 12 and 13 of a stage $p_2$ = the pressure at the exit of the spindle blade row.

Referring to Fig. 2, the line $a$ indicates the effective diameter such that the inner and outer annular blading areas are equal, and the line $b$ shows the inward convergence of the mean diameters in relation to the effective diameter in the direction of the low-pressure end.

To obtain a balanced condition, assuming the gland sealing strips at the inlet and exhaust ends of the turbine to be of the same diameter, the following relation exists for each stage:

$$D_p^2(p_0-p_2) = D_1^2(p_0-p_1) + D_2^2(p_1-p_2)$$

For equal pressure drops over the stationary and moving blade rows, the equation becomes:

$$D_p = \sqrt{\frac{D_1^2 + D_2^2}{2}}$$

where $D_p$ is the effective thrust diameter of the blade pair and greater than the numerical mean diameter $$\frac{D_1 + D_2}{2}$$

The difference between the effective and numerical mean diameters increases as the blade heights increase with the expansion of the steam, so that the numerical mean diameter $D_m$ (Fig. 2) droops away from the effective thrust diameter $D_p$. With equal velocity ratios over the stationary and moving blade rows, the pressure drop over the moving row becomes somewhat less than that over the stationary row with the result that the drooping effect becomes somewhat smaller.

By making the pressure drop over the spindle blade row smaller than that over the cylinder blade row, the numerical mean diameter may be made equal to or greater than the effective thrust diameter, $D_p$. Inasmuch as equal velocity ratios give maximum efficiency, I prefer to maintain a drooping effect.

It is evident from the foregoing, that, by selecting the proper relation between effective and numerical mean diameters and at the same time adjusting the pressure drops between the spindle and cylinder blade rows to take care of the peculiarities of design so as to maintain the relation $$D_p{}^2(P_0-P_2)=D_1{}^2(p_0-p_1)+D_2{}^2(p_1-p_2)$$

I obtain a blade path in which each pair of rows of blading is in exact balance with a single dummy piston diameter $D_p$. In other words, a single dummy piston serves one or more blade groups exactly as if a single dummy piston were applied for each pair of rows of blading. This will be clearer by regarding the above equation as applied to the first stage in Fig. 1. If, for the diameters $D_1$ and $D_2$ and the pressures $p_0$ and $p_1$, there are substituted diameters $D_3$ and $D_4$ and the pressures $p_3$ and $p_4$, respectively, the equation for the second stage becomes $$D_p{}^2(p_2-p_4)=D_3{}^2(p_2-p_3)+D_4{}^2(p_3-p_4)$$

From the first equation $$D_p{}^2=\frac{D_1{}^2(p_0-p_1)+D_2{}^2(p_1-p_2)}{(p_0-p_2)}$$

and from the second $$D_p{}^2=\frac{D_3{}^2(p_2-p_3)+D_4{}^2(p_3-p_4)}{(p_2-p_4)}$$

In other words, the stages each have such a relation of blade row sealing diameters that, for like pressure row pressure drops and for the same pressure drop over the stage and the dummy, a dummy of the same diameter is required to provide a dummy thrust balancing the stage thrust, that is, the dummy piston 14 of Fig. 1 is of proper diameter for balancing each of the stages, regarding each stage and the dummy piston to have the same pressure drop. Thus, the piston 14 may be regarded as presenting a thrust pressure area which is the correct one for each stage for the stage pressure drop, or each stage may be regarded as having its individual dummy piston pressure area; however, as the blade path and the blading are designed to require identical dummy pressure areas for the stages, one such area, that is, a dummy of single diameter, may be used for balancing in the same way as if each stage had its own dummy piston.

If the principle of the present invention is applied to a straight reaction turbine of the axial flow type and if a certain thrust is desired towards the governor end thereof so as to insure increased security against differential scaling between the cylinder and spindle blade rows, this thrust will be the addition of thrust differences between the dummy and each pair of rows of blades and will reach its full value at full primary valve opening, the primary valve being the valve controlling the admission of steam through the inlet 26 of Fig. 1 to the high-pressure end of the turbine. The thrust will then remain constant as subsequent valves for the inlets 27 and 28 come into operation. Any other arrangement will give a "spread" in thrust between the valve openings and will thus give an initial reduction in the margin of safety so far as the thrust bearing is concerned.

From the foregoing, it will be apparent that, by having the inner boundary of turbine flow passage converge relatively more toward the low-pressure end than the outer boundary diverges, it becomes possible to have the blading arranged on decreasing mean diameters toward the low-pressure end and to provide a balancing dummy piston of larger diameter than the mean diameter of the first row of blading. Furthermore, with uniform pressure distribution over the stationary and moving rows of blades of each stage, a balanced relation as between steam thrust and dummy thrust is secured when the blading is arranged on a constant effective diameter equal to the dummy diameter, that is, the dummy diameter is equal to the square root of one-half of the sum of the squares of the moving blade row maximum diameter and of the stationary blade row minimum diameter. With a constant effective diameter equal to the dummy diameter, it will be apparent that, if the cylindrical envelope of the dummy is projected to intersect the rows of blades, each pair of row of blades will be divided by the envelope into equal inner and outer annular areas. With this relation and with a given pressure drop over the dummy and over the blading, the balanced relation as between steam thrust and dummy thrust is not disturbed by having steam admitted to any of the inlets 26, 27 and 28, as determined by the load. Comparing the admission of steam through the inlet 26 for flow through all of the blading to the admission of steam through the inlet 28 for flow through the minimum number of rows of stationary and moving blades, while the total load or pressure area in the latter case is less, the pressure drop over the blading remains the same, with the result that the pressure drop over each row is larger and the sum of the products of the blade row pressure area times the pressure drop over each blade thereof remains unchanged; and, therefore, may be balanced by the same dummy piston area.

It is to be understood that the dummy diameter referred to herein is that required for balancing steam thrust, and that other conditions may call for a change in the ideal dummy diameter; however, in all cases, the basis of design is that required for balancing. In general, the basis of the invention is to have the dummy piston and the blading of each stage so arranged that the square of the dummy piston diameter times the pressure drop across the stage is equal to the square of the minimum sealing diameter of the stationary row of blades times the pressure drop across the latter added to the square of the maximum diameter of the moving row of blades times the pressure drop thereover. The ideal way for accomplishing this objective is to have the blading arranged on decreasing mean diameters toward the low-pressure end. Maximum efficiency is provided by having the relation of pressure drops of each blade pair, or stage, such as to cause equal velocity ratios for the moving and stationary rows. If the pressure drops across the stationary and moving rows of blades in a stage are equal, then the effective diameter, or diameter of the dummy piston, balancing the pair, is equal to the square root of ½ of the sum of the squares of the maximum sealing diameter of the moving rows of blades and the minimum sealing diameter of the stationary blades in the stage. The velocity ratios in the latter case are nearly the same.

It is to be understood that thrust balancing, as referred to herein, does not mean absolute balancing but a condition of near balance for the reason that it is desirable to have some residual thrust to avoid a condition of indifferent equilibrium and floating of the rotor. In applying the invention, the structure is designed for balance and then the dummy diameter is altered slightly to give the desired bias. Machines to which this invention is applicable are always provided with thrust bearings, so that they are fully able to withstand any such residual thrust. As already pointed out, the difficulty with prior arrangements is that, because of the absence of any dimensional relation as between each of the stages and the dummy piston, excessive thrusts have occurred on account of fouling of blades by scale or because of mechanical inaccuracies in the latter. On the other hand, with the present invention, as each stage is constructed and arranged so that it is balanced by a single dummy piston area, differential fouling or blading errors will not result in such excessive thrust. Hence, the present invention solves the problem of excessive thrusts for the reasons indicated while contemplating in its application, the intentional provision of some end thrust for the purpose stated and well within the capacity of the thrust bearing.

While the invention has been shown in but one form, it will be obvious to those skilled in the art that it is not so limited, but is susceptible of various changes and modifications without departing from the spirit thereof, and it is desired, therefore, that only such limitations shall be placed thereupon as are specifically set forth in appended claims.

What is claimed is:

1. In a high-pressure axial-flow energy converter utilizing elastic fluid, blading developing thrust on the rotor, a dummy piston for developing thrust on the rotor in opposition to the blading thrust, the blading being arranged on decreasing mean diameters toward the low-pressure end and so that the cylindrical envelope of the dummy piston diameter required for balancing the blading thrust divides each stage of the blading into equal annular areas inwardly and outwardly of the envelope.

2. In a high-pressure axial-flow energy converter utilizing elastic fluid, a rotor, a plurality of stages each including a row of stationary blades followed by a row of moving blades and imposing components of thrust on the rotor due to the elastic fluid, and a dummy piston carried by the rotor and acted on by the elastic fluid to provide thrust opposing the blading thrust, the blading being so arranged that the cylindrical envelope of the diameter of the dummy piston required for balancing the blading thrust divides each stage of blades into equal annular areas inwardly and outwardly of the envelope.

3. In a high-pressure axial-flow energy converter, a housing; a rotor; a dummy piston carried by the rotor; and a plurality of stages of blading; each stage including a stationary row of blades carried by the housing and a moving row of blades carried by the rotor; the blading of the stages being arranged so that, for each stage, the square of the exit diameter of the stationary blade row times the pressure drop thereover and the square of the exit diameter of the moving row times the pressure drop thereover divided by the pressure drop over the stage is the same, whereby the thrust developed by each of the stages may be balanced by the thrust, for the stage pressure drop, developed by a single dummy piston area.

4. In a high-pressure axial-flow energy converter, a housing; a rotor; a dummy piston carried by the rotor; a plurality of stages of blading; each stage including a stationary row of blades carried by the housing and a moving row of blades carried by the rotor; sealing means carried by the rotor, cooperating with each row of stationary blades, and defining with respect to the latter, a first rotor sealing diameter for each stage; and sealing means carried by the housing and cooperating with each moving row of blades so that the latter define with respect thereto a second rotor sealing diameter for each stage; the blading of the stages being arranged so that, for each stage, the square of the first sealing diameter times the pressure drop over the stationary blade row and the square of the second sealing diameter times the pressure drop over the moving blade row divided by the pressure drop over the stage is the same, whereby the thrust developed by each of the stages may be balanced by the thrust, for the stage pressure drop, developed by a single dummy piston area.

5. In a high-pressure, axial-flow reaction turbine, a plurality of stages of blading and a dummy piston, a dummy piston having such a diameter that its cylindrical envelope divides each stage of the blading into equal annular areas inwardly and outwardly of the envelope.

6. In a high-pressure axial-flow reaction turbine, a rotor, a plurality of stages of blading, each stage including a stationary row of blades followed by a moving row of blades, means providing a plurality of steam inlets, one inlet being disposed at the high-pressure end of the turbine and the other inlet or inlets being spaced along the latter so that one or more of said stages of blading are arranged between adjacent inlets, and a dummy piston carried by the rotor and providing a single piston area for balancing the thrust of each of said stages, said blading being arranged on decreasing mean diameters toward the low-pressure end of the turbine so that, for each stage, the sum of the square of the stationary row sealing diameter times the pressure drop across the row and of the square of the moving row sealing diameter times the pressure drop across the moving row divided by the stage pressure drop may be equal to the square of the diameter of the dummy piston thrust area required for balancing.

7. In a high-pressure axial-flow reaction turbine, a cylinder structure, a rotor, a plurality of stages of blading, each stage including a stationary row of blades carried by the cylinder structure and a moving row of blades carried by the rotor, and a single dummy piston for balancing the thrust of each stage, said blading defining an annular steam-flow passage diverging toward the low-pressure end of the turbine such that its outer boundary diverges and its inner boundary converges toward the low-pressure end and the convergence of the inner boundary being relatively more than the divergence of the outer boundary so that the blading may be arranged on decreasing mean diameters toward the low-pressure end of the turbine in order that, for each stage, the sum of the square of the stationary row rotor sealing diameter times the pressure drop across the stationary row and of the square of the moving row rotor sealing diameter times the pressure drop across the moving row divided by the stage pressure drop may be equal to the square of the diameter of the dummy piston thrust area required for balancing.

8. In a turbine, a rotor, a cylinder, stationary blading carried by the cylinder, moving blading carried by the rotor, the interior of the cylinder diverging and the exterior of the rotor converging to provide a space of annular section which diverges from the high-pressure end to the low-pressure end to accommodate blading increasing in height toward the low-pressure end, the convergence of the exterior of the rotor increasing in relation to the cylinder divergence toward the low-pressure end such that the blading has a constant effective diameter from end to end of the turbine, the effective diameter being that of a circle or cylinder dividing the blading into equal inner and outer annular areas, and a dummy piston having its diameter equal to the effective diameter.

9. In a turbine, a plurality of stages each comprising stationary and moving rows of blades having substantially equal pressure distribution thereover and a dummy piston whose diameter is equal to the square root of one-half the sum of the squares of the minimum diameter of the stationary blade row of a stage and of the maximum diameter of the moving blade row of the stage.

10. In a high pressure, axial-flow turbine, a plurality of stages, each stage comprising a row of stationary blades followed by a row of moving blades, shrouds for the rows of blades, sealing means cooperating with the shrouds, and a single dummy piston for balancing the blading steam thrust; each stage having a minimum stationary row sealing diameter, a maximum moving row sealing diameter, and distribution of pressure drops over the blade rows having the following relation to the dummy piston diameter and stage pressure drop:

$$D_p^2(p_0-p_2) = D_1^2(p_0-p_1) + D_2^2(p_1-p_2)$$

where $D_p$ is the dummy diameter
$D_1$ is the inner stationary row sealing diameter
$D_2$ is the maximum moving row sealing diameter
$p_0-p_2$ is the stage pressure drop
$p_0-p_1$ is the stationary row pressure drop
$p_1-p_2$ is the moving row pressure drop in order that, with a single dummy piston, variations in unbalanced thrust due to variation in operating conditions may be minimized.

11. In a turbine, a plurality of stages each comprising stationary and moving rows of blades having substantially equal pressure distribution thereover, shrouds for the blades, and seal strips carried by the cylinder and by the rotor and having sealing relation with respect to the outer surfaces of the moving blade row shrouds and the inner surfaces of the stationary blade row shrouds; the maximum diameter of the moving blade row of a stage being the outside diameter of the blade row shroud and the minimum diameter of the sationary blade row of the stage being the inside diameter of the shroud of the stationary row; and a dummy piston whose diameter is equal the square root of one-half the sum of the squares of the minimum diameter of the stationary blade row of a stage and of the maximum diameter of the moving blade row of the stage.

12. In a high-pressure axial flow energy converter, a rotor; a cylinder; a plurality of stages; each stage comprising stationary and moving rows of blades carried by the cylinder and by the rotor, respectively, and of such construction that drop in pressure occurs over each row of blades; shrouds carried by the respective rows of blades; seal strips carried by the rotor and by the cylinder and having sealing relation, respectively, with respect to the stationary blade row shroud surfaces which are inside with reference to the rotor axis moving blade row shroud surfaces which are outside with reference to the rotor axis; the seal strips carried by the rotor providing, for each stationary blade row, a rotor pressure area determined by the seal strip outside diameter, and each moving blade row and its shroud providing a rotor pressure area determined by the outside diameter of the shroud; and a dummy piston carried by the rotor for balancing the elastic-fluid thrust imposed on the latter due to the pressure drop across the stationary and moving rows of blades and effective on said areas; the dummy piston having such diameter that the product of its area times the pressure drop across the blading of each stage is equal to the product of the rotor pressure area for the stationary blade row of the stage times the pressure drop across the row added to the product of the rotor pressure area for the moving blade row of the stage times the pressure drop across the row.

13. In a high-pressure reaction turbine of the axial-flow type, a cylinder, a rotor, blading carried by the cylinder and by the rotor, said blading defining an annular steam flow passage diverging toward the low-pressure end of the turbine such that its outer boundary diverges and its inner boundary converges toward the low-pressure end and the convergence of the inner boundary being relatively more than the divergence of the outer boundary so that the blading may be arranged on decreasing mean diameters toward the low-pressure end of the turbine to provide a constant effective blade diameter such that each stage has equal annular areas inside and outside of the effective diameter circle, and a balancing dummy piston having a diameter equal to said effective diameter.

14. In a high-pressure reaction turbine of the axial-flow type, a cylinder, a rotor, blading carried by the cylinder and by the rotor, and a dummy piston carried by the rotor, said blading defining an annular steam flow passage diverging toward the low-pressure end of the turbine such that its outer boundary diverges and its inner boundary converges toward the low-pressure end and the convergence of the inner boundary being relatively more than the divergence of the outer boundary so that the blading may be arranged on decreasing mean diameters toward the low-pressure end and such that the projected cylindrical envelope diameter of dummy required to develop a thrust intersects each stage and divides it into equal inner and outer annular areas.

ERIC A. ZETTERQUIST.